United States Patent
Yan

(10) Patent No.: US 10,708,349 B2
(45) Date of Patent: Jul. 7, 2020

(54) OFFLOADING A DISTRIBUTION SERVER TASK TO A MEDIA GATEWAY

(71) Applicant: Telefonaktiebolaget L M Ericsson (publ), Stockholm (SE)

(72) Inventor: Feng Yan, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1090 days.

(21) Appl. No.: 14/880,060

(22) Filed: Oct. 9, 2015

(65) Prior Publication Data

US 2017/0104816 A1   Apr. 13, 2017

(51) Int. Cl.
| | |
|---|---|
| *H04L 29/08* | (2006.01) |
| *H04L 29/06* | (2006.01) |
| *H04N 21/266* | (2011.01) |
| *H04N 21/438* | (2011.01) |
| *H04N 21/63* | (2011.01) |
| *H04N 21/433* | (2011.01) |
| *H04N 21/6405* | (2011.01) |
| *H04N 21/6408* | (2011.01) |
| *H04N 21/462* | (2011.01) |
| *H04N 21/222* | (2011.01) |
| *H04N 21/231* | (2011.01) |
| *H04N 21/6375* | (2011.01) |
| *H04N 21/482* | (2011.01) |

(52) U.S. Cl.
CPC ...... *H04L 67/1004* (2013.01); *H04L 65/4076* (2013.01); *H04L 65/4084* (2013.01); *H04L 67/1095* (2013.01); *H04N 21/222* (2013.01); *H04N 21/23106* (2013.01); *H04N 21/26616* (2013.01); *H04N 21/4331* (2013.01); *H04N 21/4384* (2013.01); *H04N 21/4622* (2013.01); *H04N 21/4821* (2013.01); *H04N 21/632* (2013.01); *H04N 21/6375* (2013.01); *H04N 21/6405* (2013.01); *H04N 21/6408* (2013.01)

(58) Field of Classification Search
CPC ............. H04L 65/4084; H04L 65/4069; H04L 67/104; H04L 67/1074; H04L 67/108; H04L 65/60

See application file for complete search history.

(56) References Cited

U.S. PATENT DOCUMENTS

| | | | |
|---|---|---|---|
| 7,370,129 B2 | 5/2008 | Green et al. | |
| 7,477,653 B2 | 1/2009 | Smith et al. | |
| 7,562,375 B2 | 7/2009 | Barrett et al. | |
| 8,011,012 B2 | 8/2011 | Carle | |
| 8,661,486 B2 | 2/2014 | Ou et al. | |
| 9,673,996 B1 * | 6/2017 | Upadhyay | ............... H04L 12/56 |

(Continued)

*Primary Examiner* — Barbara B Anyan
(74) *Attorney, Agent, or Firm* — Sage Patent Group

(57) ABSTRACT

A server offloads one or more tasks to a first media gateway. The server receives, from the first media gateway that is receiving a video stream of a television channel, a first message that indicates that the first media gateway is eligible to process a request for media content of the television channel that otherwise would be processed by the server. The server receives, from a second media gateway, a request for media content of the television channel. The server transmits, to the second media gateway, a redirection response that instructs the second media gateway to request the media content from the first media gateway.

21 Claims, 6 Drawing Sheets

(56) References Cited

U.S. PATENT DOCUMENTS

| | | | |
|---|---|---|---|
| 2002/0007404 A1* | 1/2002 | Vange | G06F 9/5027 709/217 |
| 2007/0047542 A1 | 3/2007 | Thukral | |
| 2008/0046912 A1 | 2/2008 | Gemelos et al. | |
| 2009/0106792 A1 | 4/2009 | Kan | |
| 2009/0254952 A1 | 10/2009 | Sridhar et al. | |
| 2010/0043034 A1 | 2/2010 | Li et al. | |
| 2011/0022689 A1 | 1/2011 | Piepenbrink et al. | |
| 2011/0119546 A1* | 5/2011 | Ver Steeg | H04N 21/6437 714/748 |
| 2011/0289538 A1* | 11/2011 | Begen | H04L 65/605 725/107 |
| 2014/0013342 A1* | 1/2014 | Swan | H04N 21/2343 725/5 |
| 2014/0040493 A1* | 2/2014 | Baldwin | H04L 45/24 709/231 |
| 2014/0052785 A1* | 2/2014 | Sirpal | G06F 3/017 709/204 |
| 2014/0122656 A1* | 5/2014 | Baldwin | H04L 65/4084 709/219 |
| 2014/0359057 A1* | 12/2014 | Hensgen | H04L 67/1095 709/217 |
| 2015/0139041 A1* | 5/2015 | Bosch | H04L 63/306 370/259 |
| 2016/0210665 A1* | 7/2016 | Champy | G06Q 30/0241 |
| 2016/0269771 A1* | 9/2016 | Bangma | H04N 21/23106 |
| 2016/0381431 A1* | 12/2016 | Patterson | H04N 21/6405 725/110 |
| 2017/0070785 A1* | 3/2017 | Zou | H04N 21/4821 |
| 2019/0007150 A1* | 1/2019 | Arcidiacono | H04H 20/24 |

\* cited by examiner

RECEIVING, FROM A FIRST MEDIA GATEWAY THAT IS RECEIVING A VIDEO STREAM OF A TELEVISION CHANNEL, A MESSAGE THAT INDICATES THAT THE FIRST MEDIA GATEWAY IS ELIGIBLE TO PROCESS A REQUEST FOR MEDIA CONTENT OF THE TELEVISION CHANNEL
310

TRANSMITTING A MESSAGE TO THE FIRST MEDIA GATEWAY THAT NOTIFIES THE FIRST MEDIA GATEWAY THAT IT CAN PROCESS A REQUEST FOR MEDIA CONTENT OF THE TELEVISION CHANNEL FROM OTHER MEDIA GATEWAYS
315

RECEIVING, FROM A SECOND MEDIA GATEWAY, A REQUEST FOR MEDIA CONTENT OF THE TELEVISION CHANNEL
320

TRANSMITTING, TO THE SECOND MEDIA GATEWAY, A REDIRECTION RESPONSE THAT INSTRUCTS THE SECOND MEDIA GATEWAY TO REQUEST THE MEDIA CONTENT FROM THE FIRST MEDIA GATEWAY
325

RECEIVING, FROM THE FIRST MEDIA GATEWAY, A MESSAGE THAT INDICATES THAT THE FIRST MEDIA GATEWAY IS NO LONGER ELIGIBLE TO PROCESS REQUESTS FOR MEDIA CONTENT OF THE TELEVISION CHANNEL
330

TRANSMITTING, TO THE SECOND MEDIA GATEWAY, A MESSAGE THAT INDICATES THAT A SUBSEQUENT REQUEST FOR MEDIA CONTENT OF THE TELEVISION CHANNEL IS TO BE DIRECTED BACK TO THE SERVER
335

OFFLOADING A DISTRIBUTION SERVER TASK TO A MEDIA GATEWAY

FIELD

Embodiments of the invention relate to the field of media processing and more specifically to offloading a distribution server task to a media gateway.

BACKGROUND

Multicast is often used to deliver live media content over a managed IPTV network. For instance, media clients such as a set-top box or web application that receives live television, connects receives live content from acquisition server (sometimes referred to as an AServer) that is coupled with a live television headend. A receiver that receives a multicast live stream is required to receive a full "I" frame (a frame that is not dependent on other frames) before it can start displaying video. "I" frames may appear in the stream periodically (e.g., every two seconds). Since the video cannot be decoded until the "I" frame is received, a user tuning to a new channel may experience a relatively long channel startup time. The multicast live stream typically uses UDP and packet loss occurs from time to time. Since there is no retransmission mechanism for UDP, packet loss may result in serious video quality degradation.

Some managed networks deploy other server(s) coupled to the acquisition server (referred to as a distribution server or sometimes a DServer) to achieve reliable UDP transmission. The DServer receives multicast video from the AServer. The DServer buffers the latest "I" frame data. Upon the receiver submitting a channel change request (e.g., first tuning to a channel or changing the channel from one channel to another), the DServer sends the buffered information to the receiver using Unicast to minimize the wait time before video starts playing. Some implementations call this feature Instant Channel Change (ICC) as it substantially reduces the amount of time to display video upon a channel change. Since the DServer buffers the video, the DServer can also fulfill packet retransmission requests from the receiver when the receiver detects packet loss. For instance, when the receiver detects that a packet has not been received, the receiver may request that packet from the DServer and if the DServer has that packet buffered, the DServer can respond with the packet to the receiver.

DServer implementation faces the problem of scalability issues. A single DServer cannot service too many clients concurrently since all data sent from the DServer to the receiver is Unicast and the amount of data the DServer sends to the client can be significant (at least for the burst of unicast video data when responding to a channel change request), which consumes a significant amount of CPU as well as bandwidth. Load balancing of DServer load is also challenging. For instance, when a popular TV program begins, there can be many channel change requests (or retransmission requests) that are received at the DServer in a short period of time. Given the real time nature of live TV transmission, a long delay is not acceptable. Thus more and more DServers have to be deployed in the cluster which increases cost.

SUMMARY

In an embodiment, a server offloads one or more tasks to a first media gateway. The server receives, from the first media gateway that is receiving a video stream of a television channel, a first message that indicates that the first media gateway is eligible to process a request for media content of the television channel that otherwise would be processed by the server. The server receives, from a second media gateway, a request for media content of the television channel. The server transmits, to the second media gateway, a redirection response that instructs the second media gateway to request the media content from the first media gateway.

In an embodiment, a first media gateway processes one or more tasks offloaded from a first server. The first media gateway receives, from a second server, a video stream of a television channel. The first media gateway buffers the video stream of the television channel. The first media gateway transmits, to the first server coupled with the second server, a first message that indicates that the first media gateway is eligible to process a request for media content of the television channel that otherwise would be processed at the first server. The first media gateway receives, from a second media gateway, a request for media content of the television channel, where the requested media content corresponds to the buffered video stream of the television channel. The first media gateway transmits, to the second media gateway, the requested media content of the television channel from the buffered video stream of the television channel.

BRIEF DESCRIPTION OF THE DRAWINGS

The invention may best be understood by referring to the following description and accompanying drawings that are used to illustrate embodiments of the invention. In the drawings:

FIG. 3 is a flow diagram that illustrates exemplary operations for offloading one or more tasks to a first media gateway according to an embodiment;

DESCRIPTION OF EMBODIMENTS

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A method and apparatus for offloading a distribution server task to a media gateway is described. In an embodiment, a media gateway (a computing device that may include the functionality of a residential gateway and/or media hub that has a relatively powerful CPU and sufficient storage to support recording and streaming), is used to offload a DServer task such as fulfilling a channel change request and/or a packet retransmission request, from another media gateway.

Figure 1:
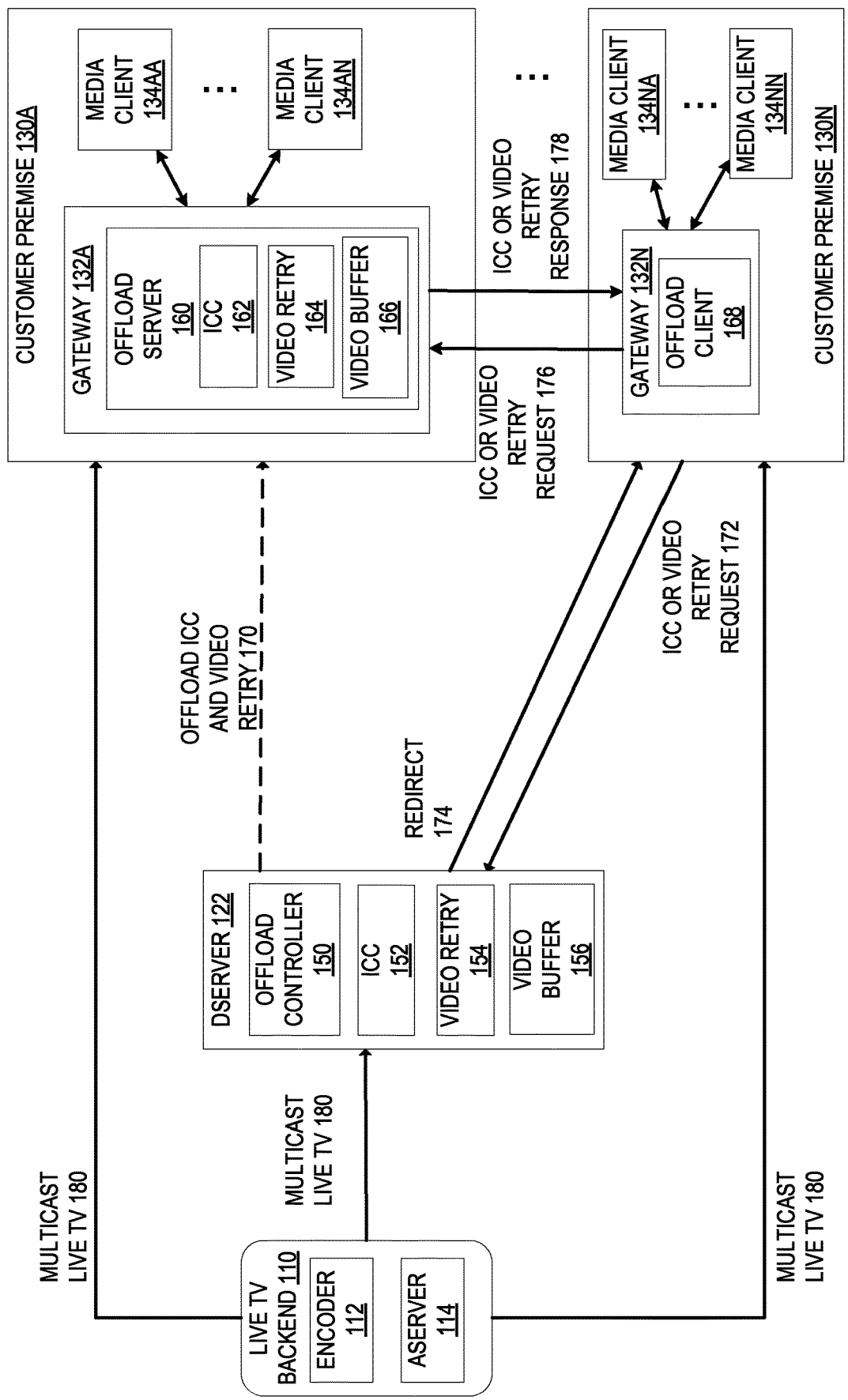
FIG. 1 illustrates an exemplary managed network where a distribution server task is offloaded to a media gateway according to an embodiment.

FIG. 1 illustrates an exemplary managed network where a distribution server task is offloaded to a media gateway according to an embodiment. The network includes the live TV backend 110 which includes the AServer 114 and the encoder 112. The AServer acquires and repackages the live TV and distributes the content, via Multicast, to the DServer 122 and media gateways 132A-N. The media gateways 132A-N are included in the customer premise 130A-N respectively. Each media gateway may be controlled by the network operator and the customer may have minimal control of the device (in some cases, the customer may not be allowed to power off the device). Each media gateway can be provided by the network operator when the customer establishes service. Each media gateway is a client device and joins a multicast live TV stream 180 from the AServer 114. Each media gateway 132 can be coupled with and serve media to one or more media clients. For instance, the media gateway 132A is coupled with the media clients 134AA-134AN and the media gateway 132N is coupled with the media clients 135NA-134NN. Each media client may be a client computing device capable of receiving and playing live television content such as a set-top box, a mobile device (e.g., smartphone, tablet, wearable device) with an application for playing live television, a laptop or desktop computer with an application for playing live television and/or a browser to play live television. The media gateways themselves may also function as a media client in some embodiments. It should be understood that the number of media clients in a particular customer premise depends on the customer and may vary from any number greater than one.

The DServer 122 receives multicast live TV stream 180 from the AServer 114 and buffers the data in its local video buffer 156. The DServer 122 includes the Instant Channel Change (ICC) module 152 to respond to channel change requests using the buffered video in the video buffer 156. The DServer 122 also includes the video retry module 154 to respond to video retransmission (or retry) requests using the buffered video in the video buffer 156.

The DServer 122 also includes the offload controller 150 that is used to offload a DServer task, such as a channel change request and/or a video retransmission request, to one or more of the media gateways 132A-N. As illustrated in FIG. 1, the DServer 122 offloads ICC and video retry 170 to the media gateway 132A. The media gateway 132A buffers the video received from the AServer 114 in its local video buffer 166 in a similar way as the DServer 122 buffers video. The media gateway 132A includes the offload server 160 that includes the ICC module 162, the video retry module 164, and the video buffer 166. The ICC module 162 is operative to respond to channel change requests from another media gateway using the buffered video in the video buffer 166. The video retry module 164 is operable to respond to video retransmission requests using the buffered video in the video buffer 166.

The offload controller 150 manages the offloading including instructing the media gateway to begin offloading and redirecting a media gateway to another media gateway to fulfill their channel change request and/or packet retransmission request. For instance, when a media gateway starts to tune to a new channel, it sends a channel change request to the DServer 122 as it normally would. After delivering the data to the media gateway, the DServer 122 may promote that media gateway to be able to process a DServer task by responding to other media gateways requesting a channel change request and/or packet retransmission request. In the example of FIG. 1, the media gateway 132A has been promoted and can respond to a DServer task for other ones of the media gateways 132B-N. To promote streaming quality and minimize streaming latency, the DServer 122 keeps a direct connection to the promoted media gateways such that those promoted media gateways have their channel change requests and retransmission requests serviced by the DServer 122 directly.

When the DServer 122 receives a channel change request or video retransmission request from another media gateway for the same channel, the DServer 122 sends a response to that other media gateway that instructs that media gateway to redirect their request to the media gateway that has been promoted. By performing redirection, the DServer 122 gracefully offloads the processing and traffic to another media gateway thereby improving its load balancing, reducing the traffic load on the IPTV network, and helping to reduce network latency. For instance, in FIG. 1, the media gateway 132N includes the offload client 168 for responding to redirection responses from the DServer 122 and transmitting DServer task requests to a promoted media gateway. When the media gateway 132N sends an ICC or video retransmission request 172 for the channel that the promoted media gateway 132A is buffering, the DServer 122 responds with a redirect message that instructs the media gateway 132N to send the request to the media gateway 132A. The media gateway 132N then transmits the ICC or video retransmission request 176 to the media gateway 132A. The media gateway 132N receives the request, and if it can fulfill the request with the video buffered in the video buffer 166, transmits an ICC or video retransmission response 178 to the media gateway 132N. In an embodiment, a promoted media gateway loses its ability to respond to offloaded DServer tasks when it stops buffering video, which may occur when it changes channels, is shut off, or otherwise stops receiving video.

Figure 2:
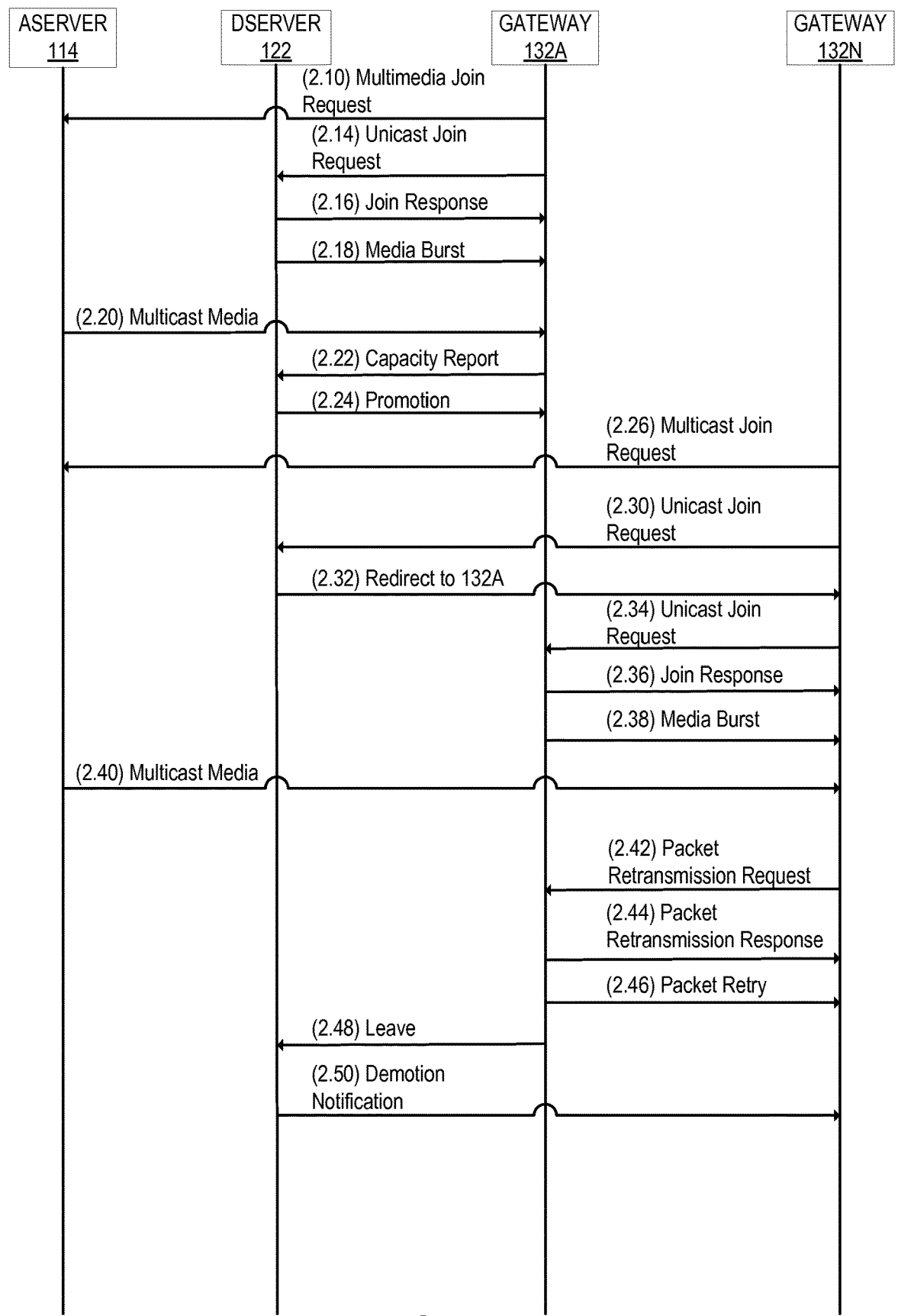
FIG. 2 is a sequence diagram that describes exemplary operations for offloading a distribution server task to a media gateway according to an embodiment.

FIG. 2 is a sequence diagram that describes exemplary operations for offloading a distribution server task to a media gateway according to an embodiment. The operations of FIG. 2, and the flow diagrams described herein, will be described according to the exemplary embodiment of FIG. 1. However, it should be understood that the operations of FIG. 2 and the flow diagrams can be performed by embodiments different than described with respect to FIG. 1, and the embodiment described with respect to FIG. 1 can perform operations different than those described in FIG. 2 and the other flow diagrams.

At operation 2.10, the media gateway 132A sends a multimedia join request (e.g., an IGMP request) for a particular TV channel that is received at the AServer 114. The media gateway 132A typically does not have a direct connection to the AServer 114; instead the multimedia join request is transmitted through one or more intermediary devices until it reaches the AServer 114. Since the video cannot be decoded until an "I" frame is received and the first frames of the received video stream may not be an "I" frame, a relatively long channel startup time may be experienced when joining the multicast group. To minimize this potential delay, the media gateway 132A sends a unicast join request to the DServer 122 at operation 2.14 (a channel change request) for the TV channel. The DServer 122 receives the join request and sends a join response to the media gateway 132A at operation 2.16. Although not shown in FIG. 2, the DServer 122 has joined the multicast data stream of the television channel and is buffering video of the television channel including the latest "I" frame. At operation 2.18 the DServer 122 sends a media burst (e.g., a burst of video) from the buffered video stream of the television channel to the media gateway 132A including the latest "I" frame. The media burst may be faster than real time. For instance, the DServer 122 may send two seconds of video in a time period less than two seconds. The media gateway 132A may then process the unicast burst of media such as delivering the unicast burst to one or more media clients 134AA-134AN for decoding and playback. The AServer 114 transmits the multicast media to the media gateway 132A at operation 2.20 (e.g., a video stream of the television channel). The media gateway 132A may then process the multicast media such as delivering the media to one or more media clients 134AA-134AN. It should be understood that the order of operations 2.10-2.20 is exemplary and different orders are possible. For example, the multicast media stream of operation 2.20 may occur before any of the operations 2.14-2.18.

The media gateway 132A is adapted to buffer the video received from the AServer 114 and/or the DServer 122. After buffering a threshold amount of video (e.g., ten seconds of video), the media gateway 132A sends a capacity report to the DServer 122 that indicates that the media gateway 132A is eligible to process a request for media content of the television channel that otherwise would be processed by the DServer 122. The capacity report may also indicate how much CPU and/or bandwidth resources are available on the media gateway 132A that can be potentially utilized to service other media gateways. The DServer 122 can use the information provided in the capacity report to determine how many future incoming service requests from other media gateways can be offloaded to the media gateway 132A. The media gateway 132A may periodically send a capacity report to the DServer 122.

The DServer 122 receives the capacity report indicating that the media gateway 132A is eligible to process a request for media content of the television channel that otherwise would be processed by the DServer 122 and transmits a promotion message to the media gateway 132A that indicates that the media gateway 132A has been promoted to service offloaded DServer task(s) for the television channel such as responding to a channel change request or a retransmission request.

Sometime later, the media gateway 132N transmits a multicast join request for the same TV channel to the AServer 114 at operation 2.26. The media gateway 132N also sends a unicast join request to the DServer 122 at operation 2.30 (a channel change request) for the TV channel. The DServer 122 receives the join request and determines whether there are any media gateways that can fulfill the request. For example, the DServer 122 may determine whether any of the media gateways has enough resources (e.g., CPU, bandwidth) to service the request. If there are multiple media gateways that can fulfill the request, the DServer 122 may select the media gateway to fulfill the request in a number of different ways. In an embodiment, the DServer 122 tracks the status and load of individual media gateways that have been promoted to balance the load between those individual media gateways. For instance, the DServer 122 may select an eligible media gateway that is not currently servicing another media gateway. As another example, the DServer 122 may select an eligible media gateway that is closest to the requesting media gateway, has the largest amount of available resources (e.g., CPU and/or bandwidth), or some combination. In an embodiment, only a media gateway in the same subnet as the requesting media gateway can fulfill the request. In such an embodiment, the DServer 122 determines whether any other media gateways in the same subnet as the requesting media gateway can fulfill the request.

In the example of FIG. 2, the DServer 122 determines that the media gateway 132A, which has been promoted to service offloaded DServer tasks(s) for the television channel, can fulfill the request and at operation 2.32, the DServer 122 transmits to the media gateway 132N a redirection response that instructs the media gateway 132N to request the media content from the media gateway 132A. The DServer 122 stores information that indicates that the media gateway 132A is servicing the media gateway 132N.

The media gateway 132A receives the redirection response and at operation 2.34, transmits a unicast join request (a channel change request) to the media gateway 132A. The media gateway 132A receives the join request and sends a join response acknowledging the join request to the media gateway 132N at operation 2.36. At operation 2.38 the media gateway 132A sends a media burst (e.g., a burst of video) from its buffered video stream of the television channel including the latest "I" frame to the media gateway 132N. The media burst may be faster than real time as described above. The media gateway 132N may then process the unicast burst of media such as delivering the unicast burst to one or more media clients 134NA-134NN for decoding and playback. This may substantially reduce the amount of time for the video of the television channel to be displayed. Thus, the media gateway 132A fulfills the channel change request instead of the DServer 122 which may help reduce the load on the DServer 122 and traffic on the IPTV network and help reduce network latency. The media gateway 132N may also receive the traffic faster than if receiving from the DServer 122 as the media gateway 132A is typically geographically closer to the media gateway 132N than the DServer 122.

The AServer 114 transmits the multicast media to the media gateway 132N at operation 2.40 (e.g., a video stream of the television channel). The media gateway 132N may then process the multicast media such as delivering the media to one or more media clients 134NA-134NN for decoding and playback.

The DServer 122 may also offload servicing a packet retransmission request for the television channel to the media gateway 132A. For example, at operation 2.42, the media gateway 132N or one of the media clients 134NA-134NN has detected packet loss and the media gateway 132N sends a packet retransmission request for the television channel to the media gateway 132A. The packet retransmission request may identify the packets (e.g., by sequence number) that it has detected as having not received. In this embodiment, since the media gateway 132N received the redirection response in operation 2.32 to direct the request to the media gateway 132A, the media gateway 132N sends the packet retransmission request to the media gateway 132A directly instead of first sending the packet retransmission request to the DServer 122. However, in another embodiment, the media gateway 132N sends the packet retransmission request to the DServer 122 which may then reply with a redirection response to the media gateway 132A or another media gateway that can fulfill the packet retransmission request. At operation 2.44, the media gateway 132N receives a packet retransmission response from the media gateway 132A acknowledging the packet retransmission request. At operation 2.46, the media gateway 132A transmits one or more packets corresponding to the packet retransmission request to the media gateway 132N. The media gateway 132N may then process the packets including delivering the packets for reconstruction to the affected media client.

In an embodiment, the media gateway 132A loses its ability to respond to offloaded DServer tasks when it stops buffering video, which may occur upon a channel change, the media gateway 132A being shut off, or otherwise the media gateway 132A stopping receiving video. At operation 2.48, the media gateway 132A transmits a leave message to the DServer 122 that indicates that it is no longer eligible to process requests for media content of the television channel from other media gateways (referred to as a leave message). This message may be transmitted as a result of the user changing the television channel or turning the media gateway and/or media client off, as examples. The DServer 122 receives the leave message and determines which, if any media gateways, are being redirected to the media gateway 132A for offloaded tasks. In the example of FIG. 2, the media gateway 132N is being redirected to the media gateway 132A. At operation 2.50, the DServer 122 sends a demotion notification message to the media gateway 132N that indicates that a subsequent request for media content of the television channel (e.g., a future packet retransmission request) is to be directed to the DServer 122 instead of the media gateway 132A. In an embodiment, the media gateway 132A transmits a leave message to the media gateway 132N directly that indicates that it is no longer eligible to process requests for media content of the television channel. Although FIG. 2 illustrates the media gateway 132A responding to requests for media content from one other media gateway, it should be understood that the media gateway 132A may fulfill requests for media content from multiple media gateways if it has sufficient resources such as CPU load and/or bandwidth.

In some circumstances it is possible that the promoted media gateway (e.g., the media gateway 132A) disconnects from the DServer 122 without sending a leave message or otherwise notifying that it is no longer eligible to process requests for media content. For example, the promoted media gateway may unexpectedly lose power or Internet connection. In such a case, a media gateway that is requesting media content from the promoted media gateway will not receive a reply. After not receiving a reply for a timeout period and/or a predefined number of retries, the requesting media gateway sends the request to the DServer 122 along with a message or flag that indicates that it could not reach the promoted media gateway. The DServer 122 will then service the requesting media gateway directly or redirect the requesting media gateway to another promoted media gateway. The DServer 122 may send periodic heartbeat messages or connectivity check messages to the promoted media gateways to verify their connection status. If the DServer 122 cannot reach a promoted media gateway, the DServer 122 will demote that media gateway and send a demotion notification message to other media gateways that were redirected to the recently demoted media gateway.

FIG. 3 is a flow diagram that illustrates exemplary operations for offloading one or more tasks to a first media gateway according to an embodiment. At operation 310, the DServer 122 receives, from a first media gateway (the media gateway 132A) that is receiving a video stream of a television channel (e.g., from the AServer 114), a first message that indicates that the media gateway 132A is eligible to process a request for media content of the television channel that otherwise would be processed by the DServer 122. For instance, the media gateway 132A is buffering the video stream of the television channel and has sufficient resources to respond to a channel change request and/or a retransmission request from one or more other media gateways. The first message may include a capacity report that indicates how much CPU and/or bandwidth resources are available on the media gateway 132A that can be potentially utilized to service other media gateways for the television channel. The DServer 122 can use the information provided in the capacity report to determine how many future incoming service requests from other media gateways can be offloaded to the media gateway 132A.

Next, at operation 315 which is optional in an embodiment, the DServer 122 transmits a message to the media gateway 132A that notifies the media gateway 132A that it can accept and process a request for media content of the television channel from other media gateways. Next, at operation 320, the DServer 122 receives, from a second media gateway (the media gateway 132N), a request for media content of the television channel. The request for media content may be a channel change request to tune to that television channel or a retransmission request for the television channel.

Next, at operation 325, the DServer 122 transmits, to the media gateway 132N, a redirection response that instructs the media gateway 132N to request the media content from the media gateway 132A. The media gateway 132N is then operable to request the media content from the media gateway 132A and the media gateway 132A is operable to fulfill the request for media content. Prior to transmitting the redirection response to the media gateway 132N, the DServer 122 may determine that the media gateway 132A has enough resources to fulfill the request. In an embodiment, the media gateway 132A is in a first customer premise and the media gateway 132N is in a second customer premise. In an embodiment, the media gateway 132A and the media gateway 132N are in the same subnet.

Sometime later, at operation 330 (which is optional in an embodiment), the DServer 122 receives from the media gateway 132A a message that indicates that the media gateway 132A is no longer eligible to process requests for media content of the television channel. This message may be sent as a result of the media gateway 132A stopping receiving the video stream of the television channel (e.g., the channel may have been changed, the media gateway and/or media client may be turned off, etc.). Next, at operation 335 (which is optional in an embodiment, the DServer 122 transmits, to the media gateway 132N, a message that indicates that a subsequent request for media content of the television channel is to be directed back to the DServer 122 instead of the media gateway 132A.

Figure 4:
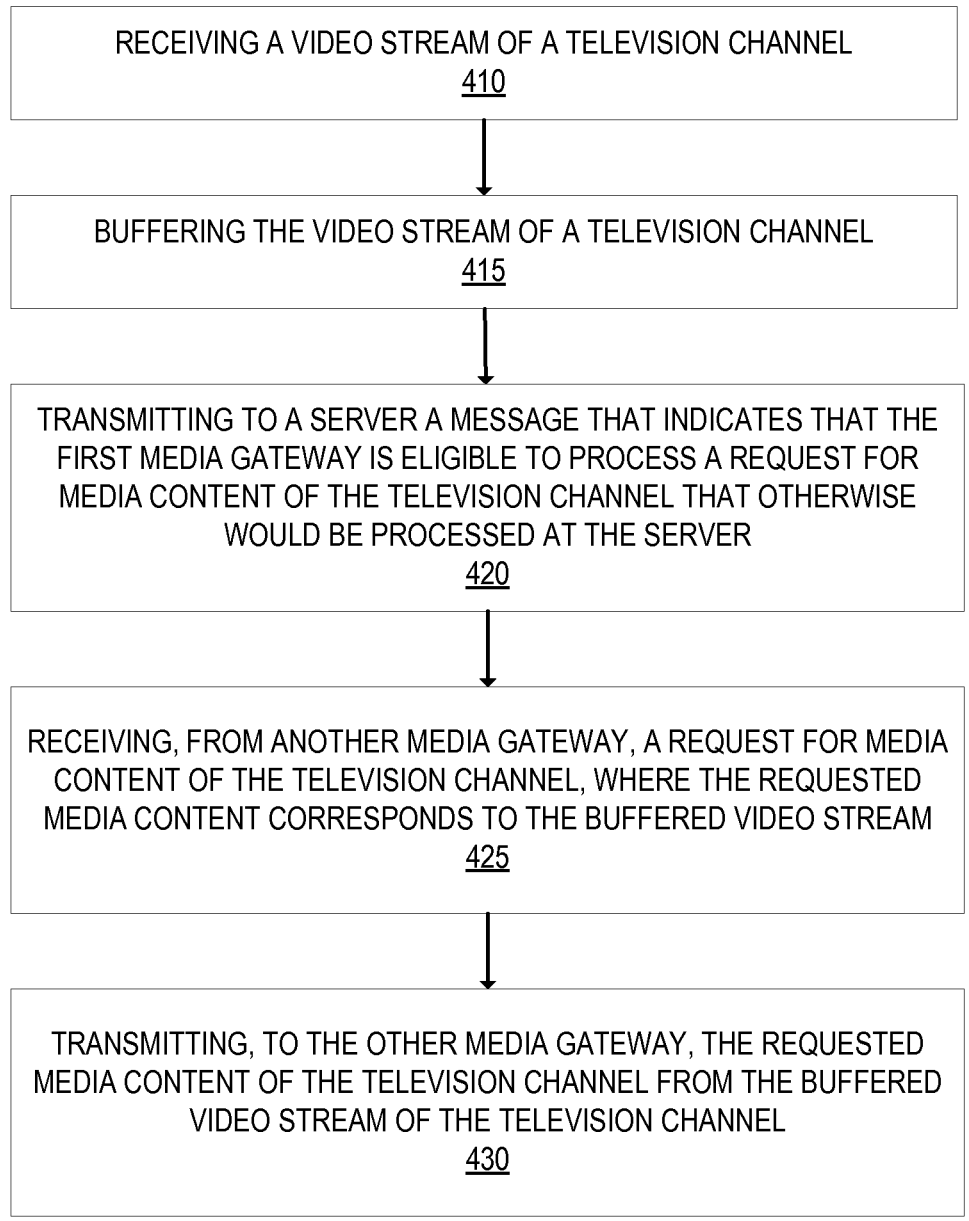
FIG. 4 is a flow diagram that illustrates exemplary operations for a first media gateway to process one or more tasks offloaded from a first server according to an embodiment.

FIG. 4 is a flow diagram that illustrates exemplary operations for a first media gateway to process one or more tasks offloaded from a first server according to an embodiment. At operation 410, the first media gateway (the media gateway 132A) receives, from a second server (the AServer 114) a video stream of a television channel. The video stream may be received over multicast. Next, at operation 415, the media gateway 132A buffers the video stream of the television channel including the latest "I" frame and caches the buffered video in the video buffer 166. As an example, the media gateway 132A may buffer the latest ten seconds (or other time period) of video. Next, at operation 420, the media gateway 132A transmits, to the first server (the DServer 122), a message that indicates that the media gateway 132A is eligible to process a request for media content of the television channel that otherwise would be processed at the DServer 122 such as a channel change request and/or a retransmission request. The message may include a capacity report that indicates how much CPU and/or bandwidth resources are available on the media gateway 132A that can be potentially utilized to service other media gateways for the television channel. The DServer 122 can use the information provided in the capacity report to determine how many future incoming service requests from other media gateways can be offloaded to the media gateway 132A. Next, at operation 425, the media gateway 132A receives, from another media gateway (e.g., the media gateway 132N), a request for media content of the television channel, where the requested media content corresponds to the buffered video stream. The request for media content of the television channel can be a channel change request to tune to that television channel or can be a retransmission request for one or more packets of the television channel. The media gateway 132A may be in a first customer premise and the requesting media gateway may be in a second, different, customer premise. The media gateway 132A and the requesting media gateway may be in the same subnet. Assuming that the media gateway 132A can fulfill the request, at operation 430, the media gateway 132A transmits, to the requesting media gateway, the requested media content of the television channel from the buffered video stream of the television channel. For example, if the request for media content is for a channel change request, the transmitted media content will include the latest "I" frame and other video data necessary for decoding and playback of the television channel. As another example, if the request is for a retransmission request, the transmitted media content will include at least the packets identified as not being received by the requesting media gateway through the multicast stream. The transmission of the requested media content may be through unicast. If the media gateway 132A stops receiving and buffering the video stream of the television channel, the media gateway 132A can send a message to the DServer 122 that indicates that the media gateway 132A is no longer eligible to process requests for media content of the television channel.

Figure 5:
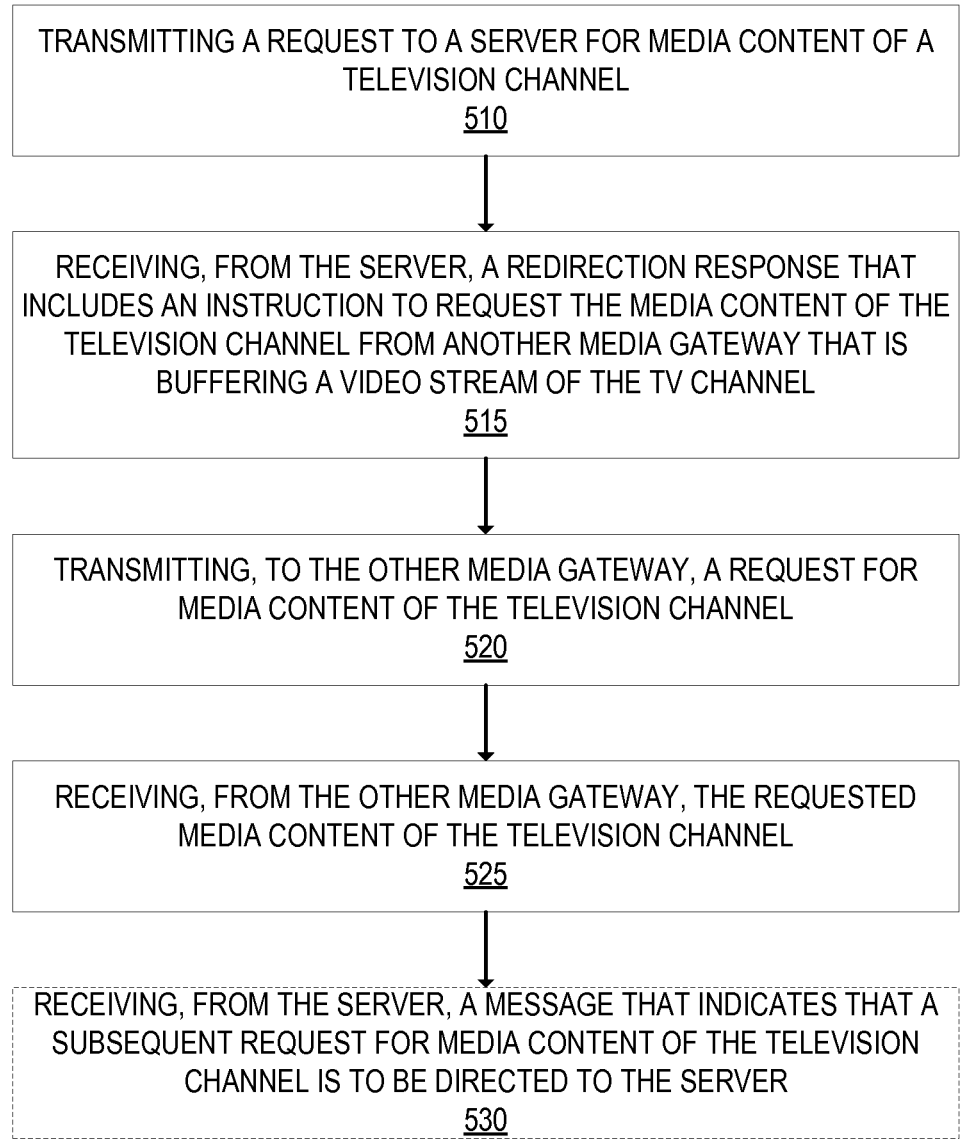
FIG. 5 is a flow diagram that illustrates exemplary operations in a first media gateway for receiving media content of a television channel according to an embodiment.

FIG. 5 is a flow diagram that illustrates exemplary operations in a first media gateway for receiving media content of a television channel according to an embodiment. At operation 510, the first media gateway (the media gateway 132N) transmits, to the DServer 122, a first request for media content of the television channel. The first request may be a channel change request to tune to the television channel. Next, at operation 515, the media gateway 132N receives, from the DServer 122, a redirection response that includes an instruction to request the media content of the television channel from a second media gateway (the media gateway 132A), which is buffering a video stream of the television channel. The media gateway 132A and the media gateway 132N may be in different customer premises. In an embodiment, the media gateway 132A and the media gateway 132N are in the same subnet. Next, at operation 520, in response to receiving the redirection response, the media gateway 132N transmits, to the media gateway 132A, a second request for media content of the television channel. The second request may correspond with the first request. For instance, if the first request is for a channel change request, the second request may also be a channel change request. As another example, if the first request is for a retransmission request, the second request may also be a retransmission request. However, the second request may be different than the first request in certain circumstances. For instance, the first request may be for a channel change request and the second request may be for a retransmission request. Next, at operation 525, the media gateway 132N receives, from the media gateway 132A, the requested media content of the television channel. For example, if the second request is for a channel change request, the received media content will include the latest "I" frame and other video data necessary for decoding and playback of the television channel. As another example, if the second request is for a retransmission request, the received media content will include at least the missing packets. The media gateway 132N processes the received media content of the television as appropriate. Next, at operation 530, which is optional in an embodiment, the media gateway 132N receives, from the DServer 122, a message that indicates that a subsequent request for media content of the television channel is to be directed to the DServer 122. This operation may occur, for example, as a result of the media gateway 132A transmitting a message to the DServer 122 that indicates that it is no longer eligible to service requests for media content of the television channel. Although not illustrated in FIG. 5, the media gateway 132N may be joining or have joined a multicast group corresponding to the television channel.

Figure 6:
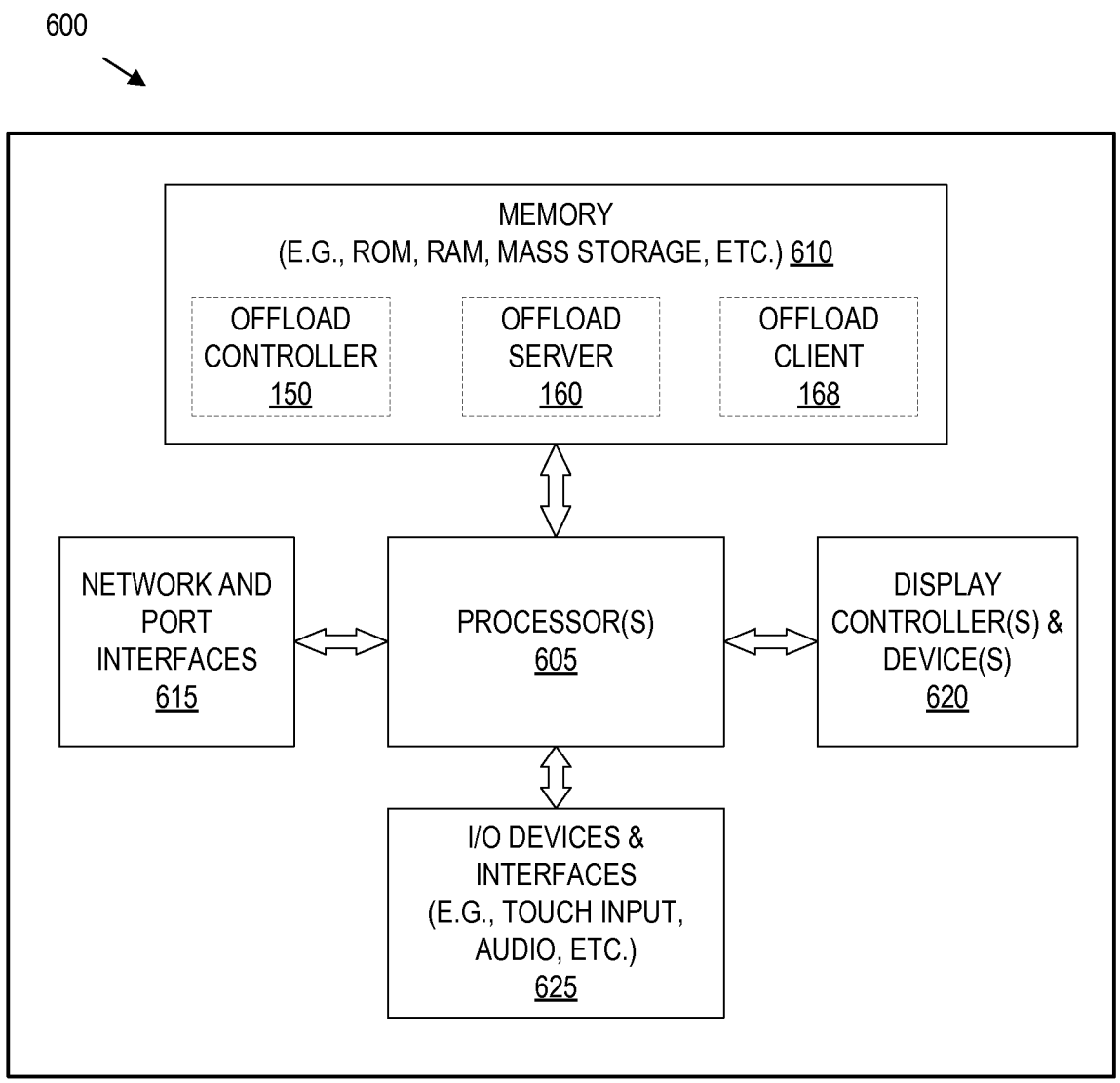
FIG. 6 illustrates a block diagram for an exemplary data processing system 600 that may be used in some embodiments.

FIG. 6 illustrates a block diagram for an exemplary data processing system 600 that may be used in some embodiments. Data processing system 600 includes one or more microprocessors 605 and connected system components (e.g., multiple connected chips). Alternatively, the data processing system 600 is a system on a chip. One or more such data processing systems 600 may be utilized to implement the functionality of the DServer 122 and/or the media gateways 132A-N. The data processing system 600 includes memory 610, which is coupled to the microprocessor(s) 605. The memory 610 may be used for storing data, metadata, and programs for execution by the microprocessor(s) 605. For example, the depicted memory 610 may store the offload controller 150 if the data processing system 600 implements the functionality of the DServer 122; may store the offload server 160 if the data processing system 600 implements the functionality of the media gateway 132A; and may store the offload client 168 if the data processing system 600 implements the functionality of the media gateway 132N; that, when executed by the microprocessor(s) 2005, causes the data processing system 600 (e.g., DServer 122, the media gateways 132A-N) to perform the operations described herein. The memory 610 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 610 may be internal or distributed memory.

The data processing system 600 also includes an audio input/output subsystem 615 which may include a microphone and/or a speaker for, for example, playing back music or other audio, receiving voice instructions to be executed by the microprocessor(s) 605, playing audio notifications, etc. A display controller and display device 620 provides a visual user interface for the user, e.g., GUI elements or windows.

The data processing system 600 also may include one or more input or output ("I/O") devices and interfaces 625, which are provided to allow a user to provide input to, receive output from, and otherwise transfer data to and from the system. These I/O devices 625 may include a mouse, keypad, keyboard, a touch panel or a multi-touch input panel, camera, optical scanner, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 600.

The I/O devices and interfaces 625 may also include a connector for a dock or a connector for a USB interface, FireWire, Thunderbolt, Ethernet, etc., to connect the system 600 with another device, external component, or a network. Exemplary I/O devices and interfaces 625 also include wireless transceivers, such as an IEEE 802.11 transceiver, an infrared transceiver, a Bluetooth transceiver, a wireless cellular telephony transceiver (e.g., 2G, 3G, 4G), or another wireless protocol to connect the data processing system 600 with another device, external component, or a network and receive stored instructions, data, tokens, etc. It will be appreciated that one or more buses may be used to interconnect the various components shown in FIG. 6.

It will be appreciated that additional components, not shown, may also be part of the system 600, and, in certain embodiments, fewer components than that shown in FIG. 6 may also be used in a data processing system 600. For example, in some embodiments where the data processing system 600 is a set top box or provides functionality of a set top box, the set top box may include components such as a digital broadcast receiver (e.g., satellite dish receiver, radio frequency (RF) receiver, microwave receiver, multicast listener, etc.) and/or a tuner that tunes to appropriate frequencies or addresses of received content. For example, a tuner may be configured to receive digital broadcast data in a particularized format, such as MPEG-encoded digital video and audio data, as well as digital data in many different forms, including software programs and programming information in the form of data files. As another example, the set top box may include a key listener unit to receive authorization and/or session keys transmitted from a server. The keys received by listener unit may be used by cryptographic security services implemented in a protection mechanism in the set top box to enable decryption of the session keys and data.

The techniques shown in the figures can be implemented using code and data stored and executed on one or more electronic devices (e.g., an event device, a hub device, an action device). Such electronic devices store and communicate (internally and/or with other electronic devices over a network) code and data using machine-readable media, such as non-transitory machine-readable storage media (e.g., magnetic disks; optical disks; random access memory; read only memory; flash memory devices; phase-change memory) and transitory machine-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a server for offloading one or more tasks to a first media gateway, comprising:
   receiving, from the first media gateway that is receiving a video stream of a television channel, a first message that indicates that the first media gateway is eligible to process a request for media content of the television channel that otherwise would be processed by the server, wherein the first media gateway buffers the video stream of the television channel including a latest "I" frame;
   receiving, from a second media gateway, a request for media content of the television channel, wherein the request for media content of the television channel is a channel change request to tune to the television channel or a retransmission request for the television channel; and
   transmitting, to the second media gateway, a redirection response that instructs the second media gateway to request the media content from the first media gateway, wherein the first media gateway responds to the channel change request or the retransmission request from the second media gateway using the buffered video.

2. The method of claim 1, wherein the first media gateway is in a first customer premise and the second media gateway is in a second customer premise.

3. The method of claim 1, wherein the first media gateway and the second media gateway are in a same subnet.

4. The method of claim 1, wherein the first media gateway buffers the video stream of the television channel.

5. The method of claim 1, further comprising:
receiving, from the first media gateway, a second message that indicates that the first media gateway is no longer eligible to process requests for media content of the television channel; and
transmitting, to the second media gateway, a third message that indicates that a subsequent request for media content of the television channel is to be directed to the server.

6. A method in a first media gateway for processing one or more tasks offloaded from a first server, comprising:
receiving, from a second server, a video stream of a television channel;
buffering the video stream of the television channel including a latest "I" frame;
transmitting, to the first server coupled with the second server, a first message that indicates that the first media gateway is eligible to process a request for media content of the television channel that otherwise would be processed at the first server;
receiving, from a second media gateway, a request for media content of the television channel, wherein the requested media content corresponds to the buffered video stream of the television channel, and wherein the request for media content of the television channel is a channel change request to tune to the television channel or a retransmission request for the television channel; and
transmitting, to the second media gateway, the requested media content of the television channel from the buffered video stream of the television channel, wherein the first media gateway responds to the channel change request or the retransmission request from the second media gateway.

7. The method of claim 6, wherein the transmitted requested media content is a burst of video from the buffered video stream of the television channel.

8. The method of claim 6, wherein the transmitted requested media content is a packet retry of one or more packets of the video stream that were not received by the second media gateway.

9. The method of claim 6, wherein the first media gateway is in a first customer premise and the second media gateway is in a second customer premise.

10. The method of claim 6, wherein the first media gateway and the second media gateway are in a same subnet.

11. The method of claim 6, further comprising:
transmitting, to the first server, a second message that indicates the first media gateway is no longer eligible to process requests for media content of the television channel.

12. A server operative to offload one or more tasks to a first media gateway, comprising:
a non-transitory computer-readable storage medium to store code; and
a set of one or more processors coupled with the non-transitory computer-readable storage medium, operative to execute the code, to:
receive, from the first media gateway that is operative to receive a video stream of a television channel, a first message that indicates that the first media gateway is eligible to process a request for media content of the television channel that otherwise would be processed by the server, wherein the first media gateway buffers the video stream of the television channel including a latest "I" frame;
receive, from a second media gateway, a request for media content of the television channel, wherein the request for media content of the television channel is a channel change request to tune to the television channel or a retransmission request for the television channel; and
transmit, to the second media gateway, a redirection response that instructs the second media gateway to request the media content from the first media gateway, wherein the first media gateway responds to the channel change request or the retransmission request from the second media gateway using the buffered video.

13. The server of claim 12, wherein the first media gateway is in a first customer premise and the second media gateway is in a second customer premise.

14. The server of claim 12, wherein the first media gateway and the second media gateway are in a same subnet.

15. The server of claim 12, wherein the first media gateway is operative to buffer the video stream of the television channel.

16. A first media gateway operative to process one or more tasks offloaded from a first server, comprising:
a non-transitory computer-readable storage medium to store code; and
a set of one or more processors coupled with the non-transitory computer-readable storage medium, operative to execute the code, to:
receive, from a second server, a video stream of a television channel;
buffer the video stream of the television channel including a latest "I" frame;
transmit, to the first server coupled with the second server, a first message that indicates that the first media gateway is eligible to process a request for media content of the television channel that otherwise would be processed at the first server;
receive, from a second media gateway, a request for media content of the television channel, wherein the requested media content corresponds to the buffered video stream of the television channel, and wherein the request for media content of the television channel is a channel change request to tune to the television channel or a retransmission request for the television channel; and
transmit, to the second media gateway, the requested media content of the television channel from the buffered video stream of the television channel, wherein the first media gateway responds to the channel change request or the retransmission request from the second media gateway.

17. The first media gateway of claim 16, wherein the transmitted requested media content is a burst of video from the buffered video stream of the television channel.

18. The first media gateway of claim 16, wherein the transmitted requested media content is a packet retry of one or more packets of the video stream that were not received by the second media gateway.

19. The first media gateway of claim 16, wherein the first media gateway is in a first customer premise and the second media gateway is in a second customer premise.

20. The first media gateway of claim 16, wherein the first media gateway and the second media gateway are in a same subnet.

21. The first media gateway of claim 16, wherein the first media gateway is further operative to execute code to:
- transmit, to the first server, a second message that indicates the first media gateway is no longer eligible to process requests for media content of the television channel.

* * * * *